US012543725B1

(12) United States Patent
Rector

(10) Patent No.: US 12,543,725 B1
(45) Date of Patent: Feb. 10, 2026

(54) PORTABLE HUNTING ENCLOSURE AND WILDLIFE OBSERVATORY AND METHOD OF USE

(71) Applicant: John Travis Rector, Austin, TX (US)

(72) Inventor: John Travis Rector, Austin, TX (US)

( * ) Notice: Subject to any disclaimer, the term of this patent is extended or adjusted under 35 U.S.C. 154(b) by 148 days.

(21) Appl. No.: 18/218,528

(22) Filed: Jul. 5, 2023

Related U.S. Application Data

(60) Provisional application No. 63/358,467, filed on Jul. 5, 2022.

(51) Int. Cl.
*A01M 31/02* (2006.01)
*E04H 15/00* (2006.01)

(52) U.S. Cl.
CPC ......... *A01M 31/025* (2013.01); *E04H 15/001* (2013.01); *E04H 15/008* (2013.01)

(58) Field of Classification Search
CPC ............. E04B 1/34384; E04B 1/34321; E04H 15/001; E04H 1/1205; E04H 15/008; A63H 33/008; A63H 33/044; A63H 33/084; A63H 33/08
See application file for complete search history.

(56) References Cited

U.S. PATENT DOCUMENTS

| | | | | | |
|---|---|---|---|---|---|
| 3,116,808 | A | | 1/1964 | Riley | |
| 3,485,320 | A | | 12/1969 | Jones | |
| 3,632,146 | A | * | 1/1972 | Buzby | E04B 1/6116 217/65 |
| 4,105,185 | A | * | 8/1978 | Cooper | E04G 17/00 249/219.1 |
| 4,584,801 | A | * | 4/1986 | Weinberger | E04B 1/34315 52/261 |
| 5,036,634 | A | * | 8/1991 | Lessard | E04H 1/1205 D25/16 |
| 5,351,453 | A | * | 10/1994 | Leslie | E04H 1/1205 52/270 |
| 5,813,737 | A | * | 9/1998 | Stone | F16B 12/48 403/217 |
| 6,739,428 | B1 | | 5/2004 | Holmes et al. | |
| 8,919,363 | B1 | * | 12/2014 | Johnson | A47B 47/027 135/160 |
| 10,612,233 | B1 | * | 4/2020 | Yu | E04B 1/34321 |
| 12,326,006 | B2 | * | 6/2025 | Dragseth | E04H 1/125 |
| 2007/0245638 | A1 | * | 10/2007 | Lai | E04H 1/125 52/79.1 |

* cited by examiner

*Primary Examiner* — Brian E Glessner
*Assistant Examiner* — Daniel J Kenny
(74) *Attorney, Agent, or Firm* — John Rizvi; John Rizvi, P.A.—The Patent Professor ®

(57) ABSTRACT

A portable enclosure comprising: a plurality of complementary components, where the plurality of complementary components create a structure with a first opening and a second opening, and where the complementary components include: a plurality of walls to create a peripheral support of the structure, wherein each of the walls includes: a panel, where the panel includes an upper portion, a lower portion an interior side, an exterior side and a pair of lateral sides, a pair of opposing vertical support columns, and a set of complementary notched beams, where the set of complementary notched beams enable adjacent walls to connect with each other; a flooring section; a roof section atop the structure; and a door which is integrated within a first wall of the plurality of walls, the door is pivotally connected to one of the support columns.

17 Claims, 10 Drawing Sheets

PORTABLE HUNTING ENCLOSURE AND WILDLIFE OBSERVATORY AND METHOD OF USE

CROSS-REFERENCE TO RELATED APPLICATION

This application claims the benefit of U.S. Provisional Patent Application No. 63/358,467, filed on Jul. 5, 2022, which is incorporated herein by reference in its entirety.

FIELD OF THE INVENTION

The present invention relates generally to a deer hunting housing structure, and more particularly, to a portable deer hunting housing structure.

BACKGROUND OF THE INVENTION

Deer stands are open or enclosed structures or platforms used by hunters to elevate the hunter and/or give a hunter a better vantage point while hunting. These structures are designed to help get the hunter out of the weather and keep the hunter hidden from view of deer or game.

Deer stands are usually assembled to be a permanent structure at a desired hunting site. Erecting such a permanent structure is a time-consuming process which requires particular/specialized equipment and tools. Furthermore, many hunting sites are located in areas with uneven terrain which, when compared with even/level ground, makes the task of building a permanent structure much more difficult. In addition, a permanent structure is subjected to continued exposure to weather conditions which will contribute to the structure's deterioration. As a permanent structure, the deer stand is also vulnerable to vandalism and theft.

The challenges associated with building and transporting deer stands intended as permanent structures have caused deer stand developers to consider designing and building portable deer stands. However, these portable deer stands are usually bulky and are often difficult to transport to hunting sites in remote areas with uneven terrain.

Ideally, it would be extremely useful to provide a deer stand structure that is lightweight, and which can be easily erected without the need for specialized tools, equipment, or expertise. Furthermore, the structure should be easy to set up in uneven terrain.

Accordingly, there is need for a deer stand assembly that can be portable and can be erected upon uneven ground. In addition, the assembly should receive limited exposure to the elements and should be less vulnerable to vandalism and theft when compared with the traditional permanent deer stand structures.

SUMMARY OF THE INVENTION

The present invention is directed to a structure built using interlocked complementary components. A portable deer hunting stand, hunting enclosure, and wildlife observatory structure is assembled from components including multiple walls, a flooring section, a roof section, and a door. Walls that are designed to be placed in adjacent positions in the assembled deer hunting stand, hunting enclosure, and wildlife observatory structure are coupled to each other via an interlocking mechanism using complementary slotted/notched beam components. The door and each of the walls include a window, each window having a covering. The deer hunting stand and wildlife observatory structure, which is configured to be a stand-alone structure, is built to be lifted off the ground via a base designed to enhance stability. The deer hunting stand, hunting enclosure and wildlife observatory structure is built from lightweight materials to be portable and can be quickly disassembled via the interlocking mechanism.

The present invention may be directed to a portable hunting enclosure where the portable hunting enclosure may include a plurality of complementary components of predetermined dimensions, where the plurality of complementary components create a structure with a first opening and a second opening, and where the complementary components include: a plurality of walls to create a peripheral support of the structure, wherein each of the walls includes: a panel, where the panel includes an upper portion, a lower portion an interior side, an exterior side and a pair of lateral sides, a pair of opposing vertical support columns, and a set of complementary notched beams, where the set of complementary notched beams enable adjacent walls to connect with each other via an interlocking mechanism to provide an interlocked enclosure; a flooring section to fit within the second opening; a roof section atop the structure within the first opening; and a door which is integrated within a first wall of the plurality of walls, the door is pivotally connected to one of the support columns of the wall.

In an embodiment of the present invention the set of complementary notched beams may include a first set of beams and a second set of beams, where each of the first set of notched beams and the second set of notched beams includes an upper notched beam and a lower notched beam.

In an embodiment of the present invention each first set of beams includes a pair of upward facing notches, and where each second set of beams includes a pair of downward facing notches.

In an embodiment of the present invention the upward facing notches and the downward facing notches are complementary to interlock on themselves and interlock the plurality of walls together.

In an embodiment of the present invention each of the pair of opposing vertical support columns includes a base sections, where the base sections extend beyond the panel be in contact with the ground beneath the portable hunting enclosure.

In an embodiment of the present invention the base sections provide stability to the portable hunting enclosure.

In an embodiment of the present invention the set of complementary notched beams connect together to create a plurality of shaped intersections.

In an embodiment of the present invention the plurality of shaped intersections include an upper set of shaped intersections and a lower set of shaped intersections.

In an embodiment of the present invention the flooring section includes a plurality of cutouts to receive the lower set of shaped intersections.

In an embodiment of the present invention the roof section includes a plurality of cutouts to receive the upper set of shaped intersections.

In an embodiment of the present invention each wall of the plurality of walls further includes a horizontal support beam, where the horizontal support beams support the roof section.

In an embodiment of the present invention at least one of the panels includes an opening.

In an embodiment of the present invention the opening is a window.

In an embodiment of the present invention the window includes a covering.

In an embodiment of the present invention the opening extends an entire width of the panel to divide the panel into an upper portion and a lower portion.

In an embodiment of the present invention the door pivots on a set of hinges.

The present invention may be directed to a method of use comprising the steps of positioning a first wall in an upright position, where the first wall is one of a set of first walls, where each wall includes a panel, a pair of vertical support beams, a pair of notched beams, where each of the pair of notched beams incudes a plurality of upward facing notches; positioning a second wall adjacent to the first wall in the same direction, where the second wall is one of a set of second walls, where each wall includes a panel, a pair of vertical support beams, a pair of notched beams, where each of the pair of notched beams includes a plurality of downward facing notches; lifting the second wall to interlock the downward facing notches against the upward facing notches of the first wall; positioning a second first wall next to the second wall at an opposing end from where the previous first wall and second wall are connected; lifting the second wall onto the second first wall to interlock the downward facing notches of the second wall onto the upward facing notches of the first wall; positioning a second second wall adjacent to the first wall and the second first wall; lifting the second second wall to interlock the downward facing notches of the second second wall onto the upward facing notches of the first wall and of the second first wall; and opening a door to access an interior of the portable hunting enclosure, where the door is positioned on one of at least the first wall or the second wall.

Accordingly, the method may further include positioning a floor portion within the interior of the portable hunting enclosure, where the floor portion rests horizontally.

Accordingly, the method may further include positioning a roof portion atop the set of walls in a horizontal configuration.

The present invention may be directed to a portable hunting enclosure, where the portable hunting enclosure may comprise a plurality of complementary components, where the plurality of complementary components create a structure with a first opening and a second opening, and where the complementary components include: a plurality of walls to create a peripheral support of the structure, wherein each of the walls includes: a panel, where the panel includes an upper portion, a lower portion an interior side, an exterior side and a pair of lateral sides, a pair of opposing vertical support columns, and an interlocking mechanism to enable adjacent walls to connect to provide an interlocked enclosure, where the interlocking mechanism includes a set of complementary notched beams, where the complementary set of notched beams includes an upper set of beams and a lower set of beams; and a plurality of notches on the set of complementary notched beams, where the plurality of notches interlock with each other on the set of complementary notched beams; and a flooring section to fit within the second opening; a roof section atop the structure within the first opening; and a door which is integrated within a first wall of the plurality of walls, the door is pivotally connected to one of the support columns of the wall, and where the door enables access into an interior of the structure.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the at to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward a structure built using an interlocking of complementary components.

Figure 1:
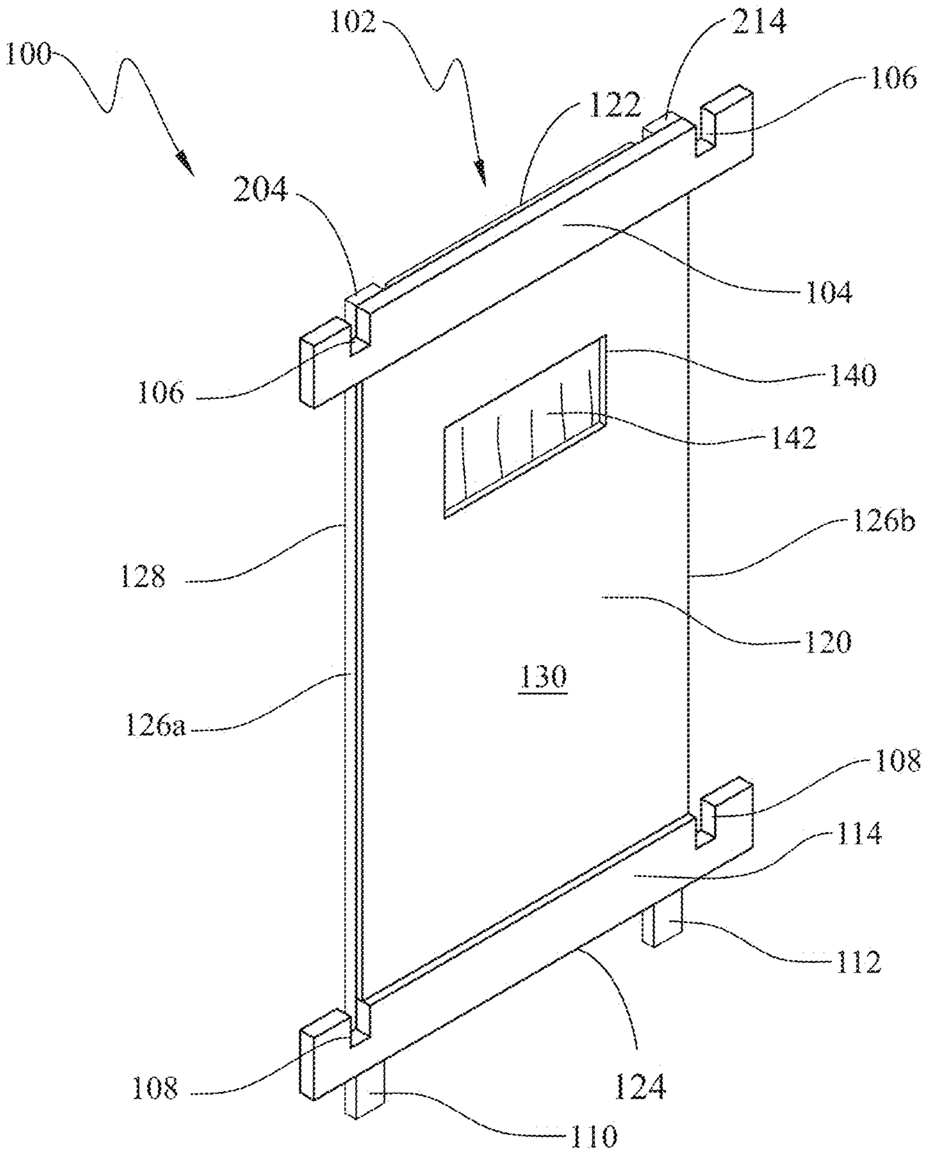
FIG. 1 illustrates an exterior view of a first wall used to assemble a deer hunting stand structure, according to one or more embodiments of the disclosure.

With reference now to the figures, and beginning with FIG. 1, there is depicted an exterior view of a first wall 102 which may be used to assemble a deer hunting stand, a portable hunting enclosure, or wildlife observatory structure 100, according to one or more embodiments of the present invention. As described herein, the outer/exterior view provides a view of the outer/exterior side of the wall 102. The wall 102 may be comprised of a panel 120, where the panel 120 may be rectangular or square shaped. The panel 120 may be comprised of an upper portion 122, a lower portion 124, a pair of lateral edges (first lateral edge 126*a*, and second lateral edge 126*b*), an interior surface 128 and an exterior surface 130.

The panel 102 may be coupled to a pair of notched beams 104, 114 where a first notched beam 104 may be positioned at the upper portion 122 of the panel 102, and a second notched beam 114 may be positioned at the lower portion 124 of the panel 102. The notched beams 104, 114 may include a set of slots or notches 106, 108, where the notches 106 may be positioned on the first notched beam 104 and the notches 108 may be positioned on the second notched beam 114.

Within the panel 120 may be an opening or window 140. The opening 140 may have a covering 142 to close the opening 140. The coveting 142 may be soft material like a fabric or cloth. Alternatively, the covering 142 may be hard or rigid like a glass or plexiglass to allow a user to see through the opening 140 without exposure to the elements on the opposing side of the opening 140. More than one covering 142 may be used in combination, for example plexiglass with a fabric curtain. The opening 140 may be a cutout of the panel 120. Alternatively, the opening 140 may extend across the entire panel 120 from the first lateral edge 126*a* to the second lateral edge 126*b* thereby fully separating the panel 120 into two portions, the upper portion 122 and the lower portion 124.

As will be better illustrated in FIG. 2, the first wall 102 may include a pair of opposing support columns or posts 204, 214 (hereinafter referred to as support columns). The support columns 204, 214 may be vertically positioned to reinforce the lateral strength of the panels 120. The notched beams 104, 114 may be fixedly attached at the upper portion 122 and the lower portion 124 to the pair of support columns 204, 214. Also illustrated within the first wall 102 may be a pair of base sections or feet 110, 112, which may be end portions of the support columns 204, 216, which may extend beyond the second notched beam 114.

According to one or more aspects, the notches 106, 108 of the notched beams 104 114 may be positioned so that they create an upward facing or U-shaped notch, thus open towards the upper portion 122 of the panel 120.

Figure 2:
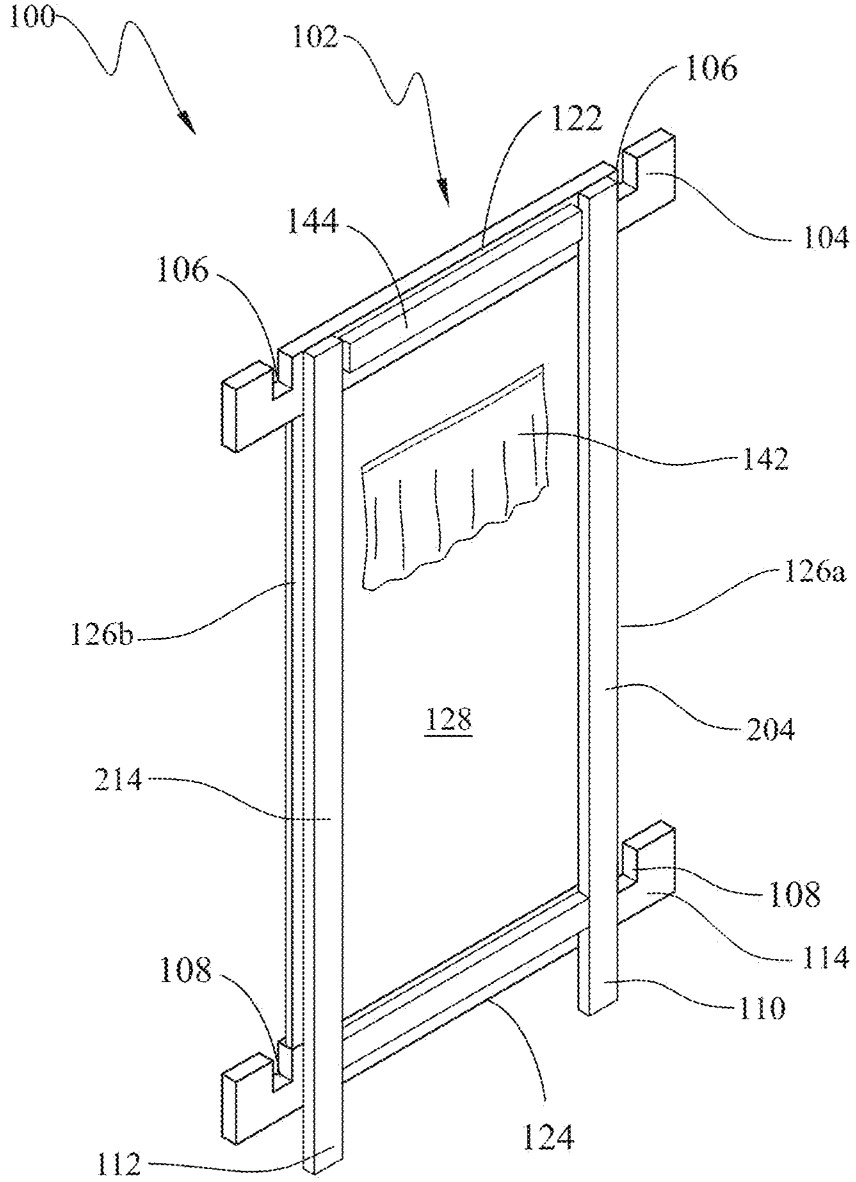
FIG. 2 illustrates an interior view of the first wall of FIG. 1, according to one or more embodiments of the disclosure.
Figure 3:
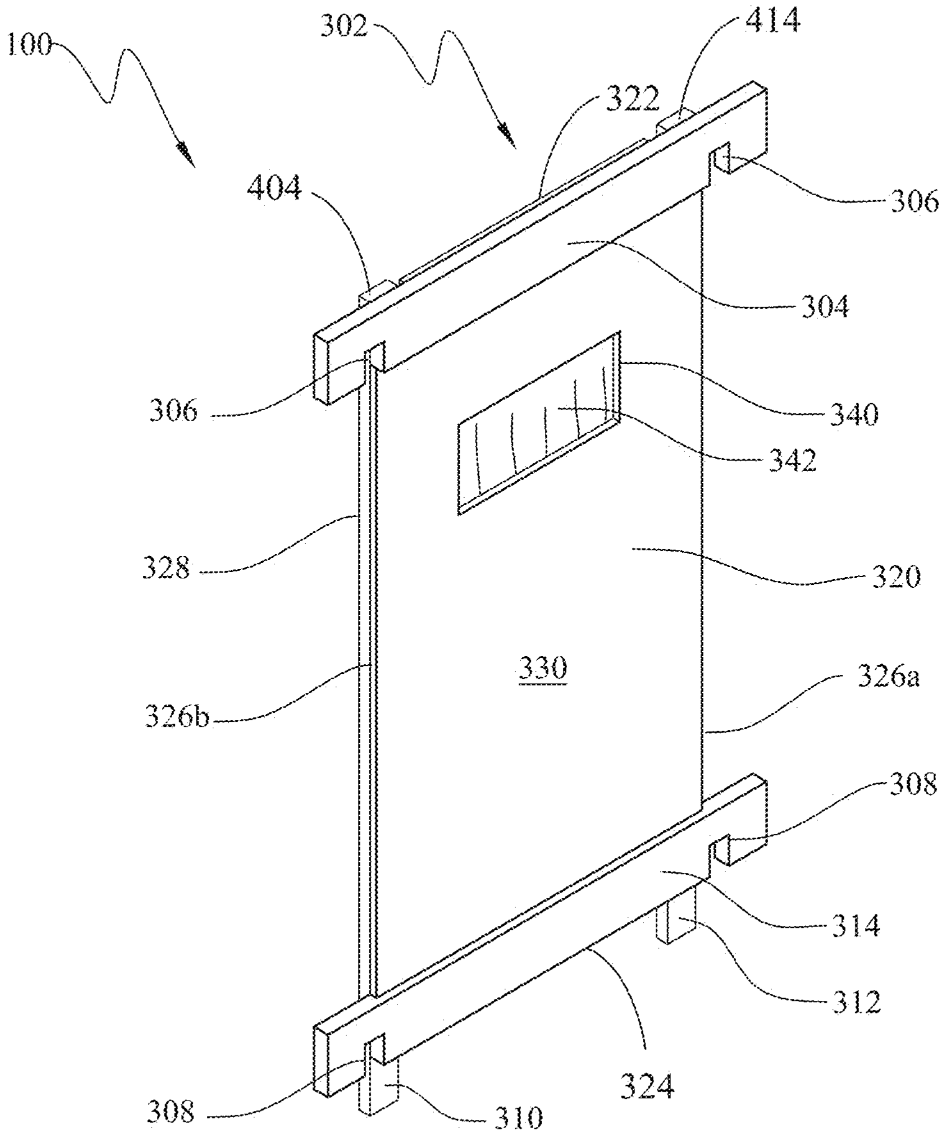
FIG. 3 illustrates an outer view of a second wall used to assemble a deer hunting stand structure, according to one or more embodiments of the disclosure.

FIG. 2 illustrates an interior view of the first wall 102 of FIG. 1, according to one or more embodiments. As illustrated, the panel 120 of the first wall 102 may comprise a pair of support columns/posts 204, 214 which may be positioned parallel to each other. A first support column 204 may be positioned along the first lateral edge 126*a*, and a second support column 214 may be positioned along the second lateral edge 126*b*. The notched beams 104, 114 may include slots/notches 106, 108 which may be used to interlock the first wall 102 with another/second wall 302 (FIG. 3).

As illustrated, the notched beams 104, 114 may be fixedly attached at first/upper and second/lower ends of the support columns 204, 214. The panel 120 may be attached to one or more of the parallel support columns 204, 214. The opening is illustrated with a curtain as the covering 142. This may allow the opening to be concealed from view within the interior of the portable hunting enclosure, 100 built using the first wall 102.

Also illustrated within the first wall 102 are the base sections or feet 110, 112, which may be end portions of the support columns 204, 214. The base sections 110, 112 may be segments of the support columns 204, 214 that extend beyond the second notched beam 114. The base sections 110, 112 may be designed to enhance stability at a ground level and enables the main body of the portable hunting enclosure 100 to be lifted off the ground.

Positioned between the support columns 204, 214 may be a horizontal support beam 144, which may be fixed to the panel 120 at the upper portion 122. As will be described in reference to FIG. 8, the horizontal support beam 144 may support a roof 804 of the portable hunting enclosure, 100 during use.

FIG. 3 illustrates an exterior view of a second wall 302 used to assemble the deer hunting stand 100, according to one or more embodiments. The second wall 302 has components that complement the components of the first wall 102, thus enabling the second wall 302 to interlock with the first wall 102 (FIG. 1), as subsequently described in the illustration of FIG. 7. The second wall 302 may comprise a pair of notched beam components 304, 314, a first notched beam 304 and a second notched beam 324, and a pair of parallel support columns/posts 404, 414. The second wall 302 may include a second panel 320 where the second panel 320 includes an upper portion 322, a lower portion 324, a pair of lateral edges 326*a*, 326*b*, an interior surface 328 and an exterior surface 330. The notched beam components 304, 314 may include slots/notches 306, 308, where the notches 306 may be positioned on the first notched beam 304, and the notches 306 may be positioned on the second notched beam 314. As illustrated, the notched beam components 304, 314 may be fixedly attached at first/upper and second/lower ends of a pair of parallel support columns/posts 404, 414.

Figure 7:
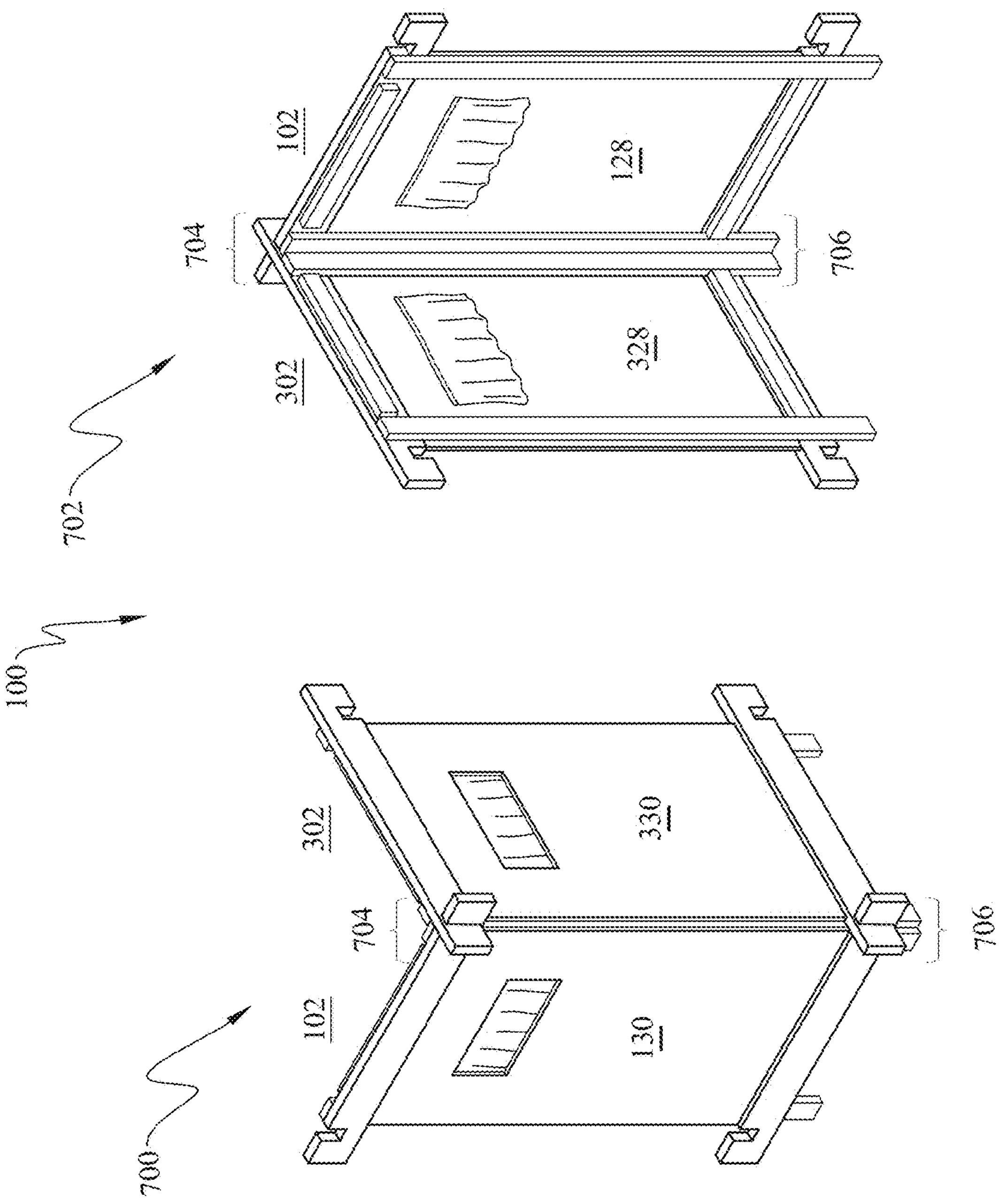
FIG. 7 illustrates a view of an outer/exterior side of a first interlocked wall structure and of an interior side of a second interlocked wall structure, according to one or more embodiments.

The notches 306, 308 of the notched beams 304, 314 respectfully, may be downward facing or open facing toward a lower portion 324 of the second panel 320, thus they may be positioned on a lower end of the notched beam components 304, 314. Notches 106, 108 and 306, 308 may represent a set of complementary notches, having different notch orientations, which enable a first wall 102 to be interlocked with the second wall 302. Thus, as illustrated in FIG. 7, adjacent walls can be interlocked together when notched beam components having different notch types/orientations are connected together in an angular/perpendicular crossing arrangement via complementary notches.

The second panel 320 of the second wall 302 may be attached to one or more of the parallel support columns/posts 404, 414. Within the second panel 320 may be an opening or window 322 which includes an opening for which there is a curtain/covering. Similar to the first wall 102, the opening 340 may have a covering 342 to close the opening 340. The covering 342 may be soft material like a fabric or cloth. Alternatively, the covering 342 may be hard or rigid like a glass or plexiglass to allow a user to see through the opening 340 without exposure to the elements on the opposing side of the opening 340. More than one covering 342 may be used in combination, for example plexiglass with a fabric curtain. The opening 340 may be a cutout of the panel 320. Alternatively, the opening 340 may extend across the entire panel 320 from the first lateral edge 326*a* to the second lateral edge 326*b* thereby fully separating the panel 320 into two portions, the upper portion 322 and the lower portion 324.

Also illustrated within the second wall 302 may be a pair of base sections or feet 310, 312, which are end portions of the parallel support columns/posts 404, 414. The feet 310, 312, may be segments of the parallel support columns 404, 414 that extend beyond the lower notched beam 314. The feet 310, 312 may be designed to enhance stability at a ground level and enables the portable hunting enclosure 100 to be assembled using a number of walls including the first wall 102 and the second wall 302 to be lifted off the ground.

Figure 4:
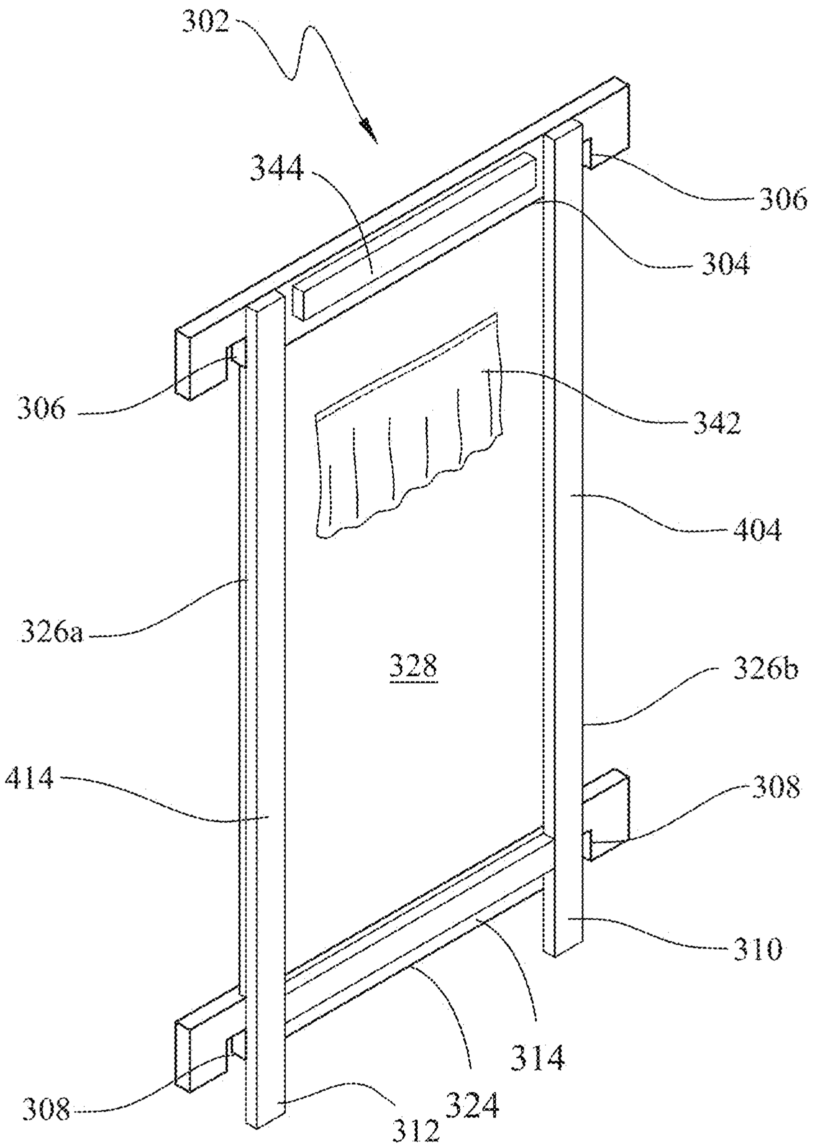
FIG. 4 illustrates an interior view of the second wall of FIG. 3, according to one or more embodiments.

FIG. 4 illustrates an interior view of the second wall 302 of FIG. 3, according to one or more embodiments. As illustrated, the second wall 302 may comprise a pair parallel support columns/posts 404, 414. The notched beams 304, 314 may include slots/notches 306, 308 which may be used to interlock the second wall 302 with a first wall 302 (FIG. 1). As illustrated, the notched beams 304, 314 may be fixedly attached at first/upper and second/lower ends of parallel support columns/posts 404, 414.

According to one or more aspects, the notched beams 104 and 114 (FIG. 1) differ from notched beam components 304, 314 in that the notches 106, 108 (FIG. 1) are located on an upper side of the notched beam components 104, 114 (FIG. 1) while notches 306, 308 are located on a lower side of the notched beam components 304, 314. Notches 106, 108 and 306, 308 may represent a set of complementary notches, having different notch orientations, which enable a first wall 102 to be interlocked with a second wall 302. Thus, as illustrated in FIG. 7, adjacent walls can be interlocked together when notched beams 104, 114, 304, 314 having different notch types/orientations are connected together in an angular/perpendicular crossing arrangement via complementary notches. Adjacent walls 102 and 302 which may align along complementary edges. For example, the lateral edge 126*a* of the panel 120 of the first wall 102 may align with the lateral edge 326*a* of the panel 320 of the second wall 302. Likewise, the lateral edge 126*b* of the panel 120 of the first wall 102 may align with the lateral edge 326*b* of the panel 320 of the second wall 302. The complementary notches (106 to 306 and 108 to 308) may be interlocked together when the notched beam 104 is connected to the notched beam 304 of the adjacent wall, and the notched beam 114 is connected to the notched beam 314.

Figure 5:
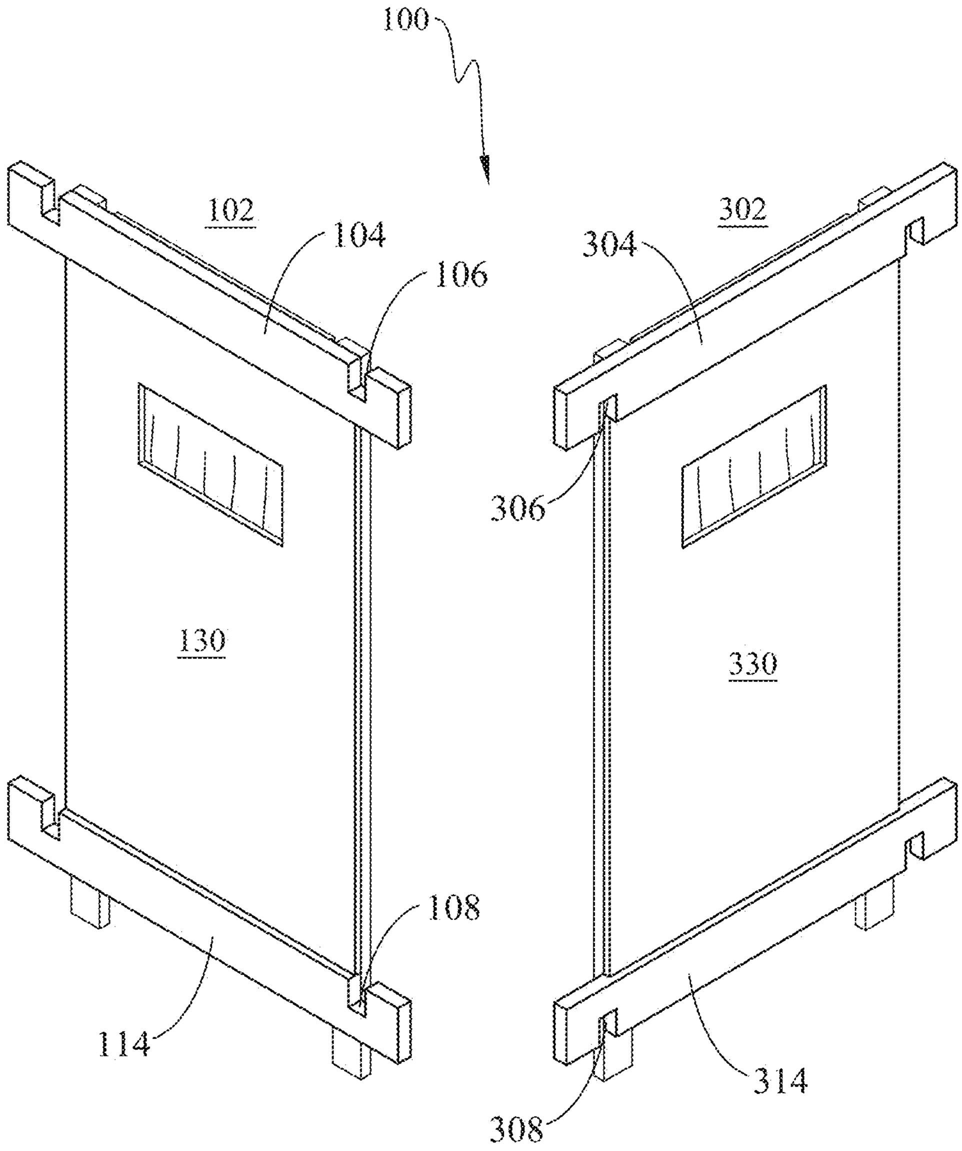
FIG. 5 illustrates a view of outer/exterior sides of the first wall of IG. 1 and the second wall of FIG. 3, according to one or more embodiments.

FIG. 5 illustrates a view of an exterior sides 130, 330 of the first wall 102 and the second wall 302, according to one or more embodiments. The first wall 102 may comprise components that are complementary to the components included within the second wall 302. Designing the walls 102, 302 to include complementary components enables the first wall 102 to be securely interlocked with the second wall 302 at the complementary notches, wherein the upward facing notches 106, 108 of the notched beams 104, 114 respectfully, may interlock with the downward facing notches 306, 308 of the notched beams 304, 314.

Figure 6:
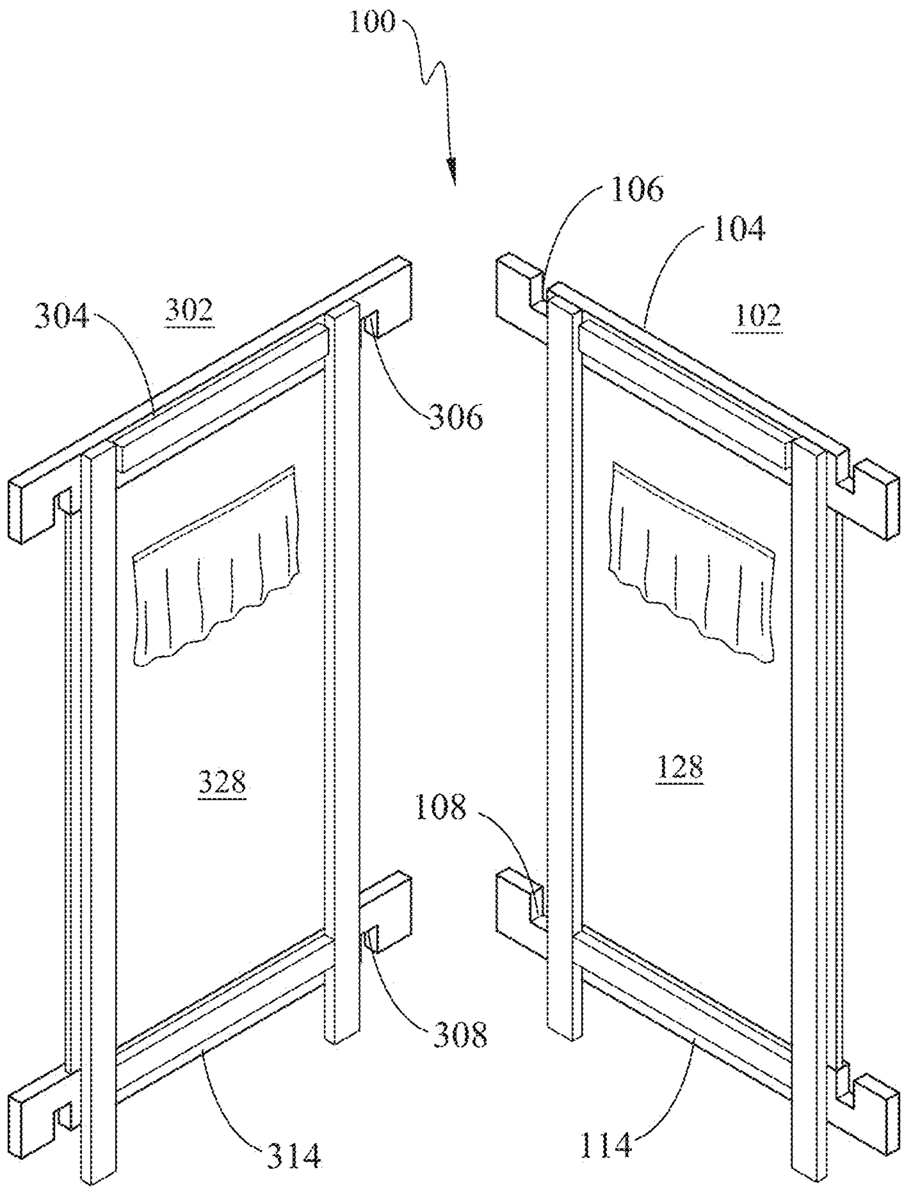
FIG. 6 illustrates a view of interior sides of the first wall of FIG. 1 and the second wall of FIG. 3, according to one or more embodiments.

FIG. 6 illustrates a view of the interior sides 130, 330 of the first wall 102 and the second wall 302 respectfully, according to one or more embodiments. The complementary components of the first wall 102 include the upward facing notches 106, 108 of the notched beams 104 and 114, while the complementary components of the second wall 302 include the downward facing notches 306, 308 of the notched beams 304 and 314, which allow the first wall 102 and the second wall 302 to interlock.

FIG. 7 illustrates a view of the first wall 102 and second wall 302 interlocked, according to one or more embodiments. As illustrated, FIG. 7 includes a first set/pair of interlocked walls 700 showing the exterior sides 128, 328 of the first wall 102 and second wall 302 and a second set/pair of interlocked walls 710 showing the interior sides 130, 330 of the first wall 102 and second wall 302. The set/pair of interlocked walls 700, 702 are also referred to herein as an interlocked wall structure. As shown in FIG. 7, each interlocked wall structure 700 and 710 includes a first wall 102 and a second wall 302.

According to one or more aspects, the set of interlocking walls 700, 702 may provide a set of approximate L-shaped intersections 704, 706 that are assembled as a result the notched beams 104, 114, 304, 314 (FIG. 6) interlocking, where the set of L-shaped intersections 704, 706 may comprise an upper set of intersections 704 and a lower set of intersections 706. The set of lower intersections 706 may facilitate the stability of the portable hunting enclosure 100 and wildlife observatory structure.

Figure 8:
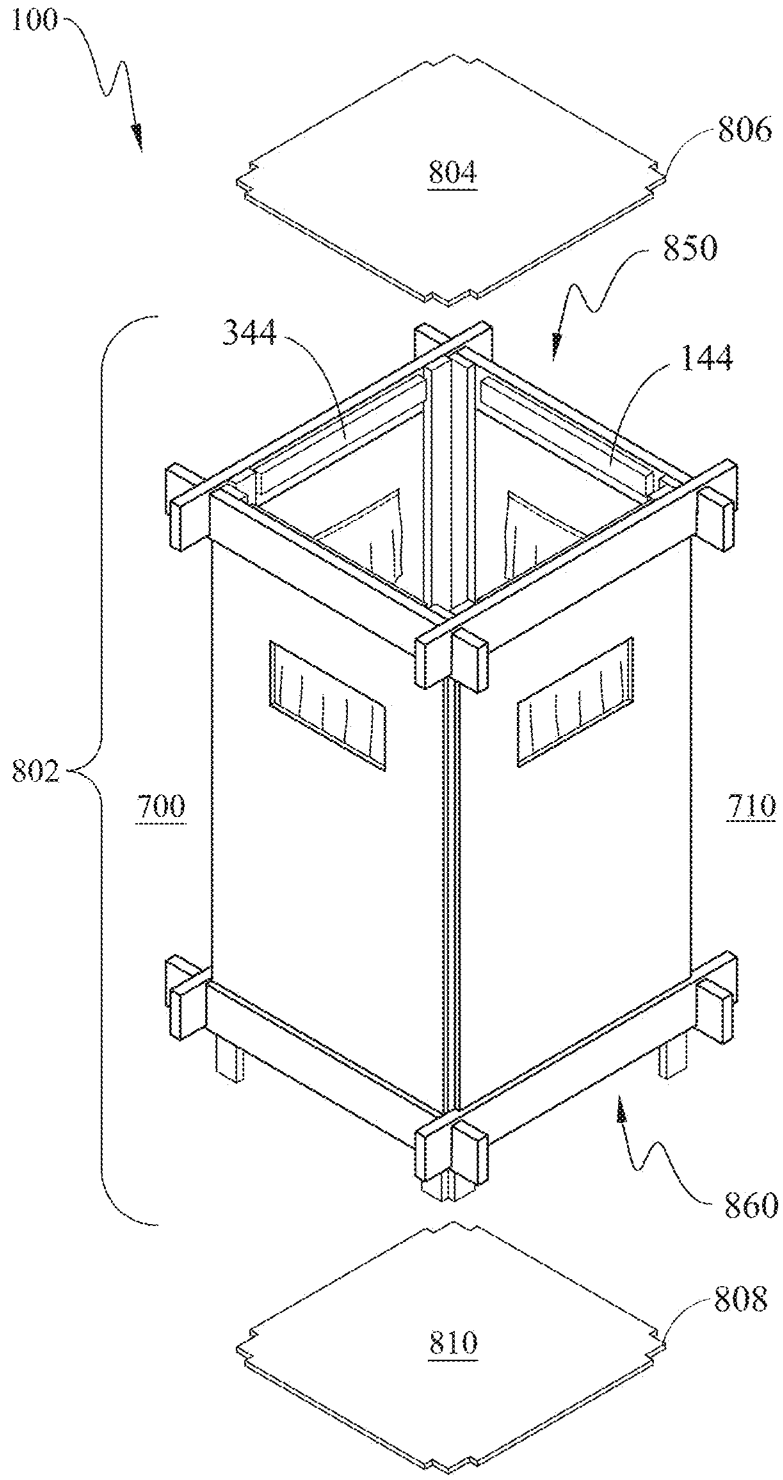
FIG. 8 illustrates a view of an interlocked enclosure, according to one or more embodiments of the disclosure.

FIG. 8 illustrates an interlocked enclosure 802 which comprises the first interlocked wall structure 700 (FIG. 7) and the second interlocked wall structure 710 (FIG. 7). As illustrated the first interlocked wall structure 700 (FIG. 7) is connected to (i.e., interlocked with) the second interlocked wall structure 710 (FIG. 7) to provide the stable interlocked enclosure 802. The portable deer stand 100 may include a roof section 804 and a flooring section 810.

According to one or more aspects, the roof section 804 is placed into a first opening 850 formed at an upper end of the interlocked enclosure 802 and supported top the horizontal support beams 144, 344. The roof section 804 may include a set of cutouts 806 to receive the upper L-shaped intersections 704 (FIG. 7) Accordingly, the roof section 804 may be sized and shaped to be securely fitted into the first opening 850.

According to one or more aspects, the flooring section 810 may be placed into a second opening 860 formed at a lower end of the interlocked enclosure 802. The flooring section 810 may include a set of cutouts 808 to receive the lower L-shaped intersections 706 (FIG. 7). Accordingly, the flooring section 810 is sized and shaped to be securely fitted into the second opening 860.

Figure 9:
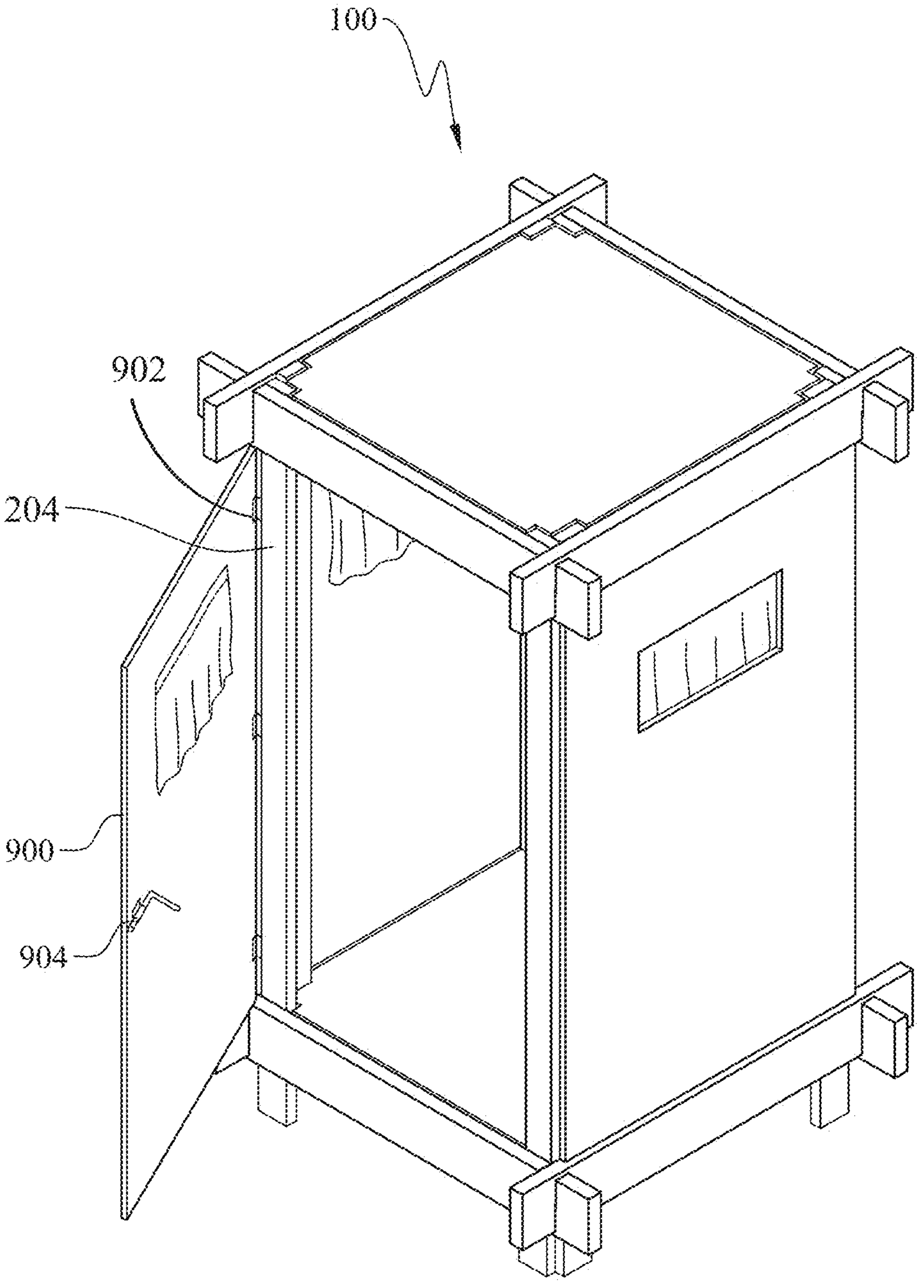
FIG. 9 illustrates an isometric view of a portable deer hunting stand and wildlife observatory structure, according to one or more embodiments.

FIG. 9 illustrates an isometric view of the portable hunting enclosure and wildlife observatory structure 100, according to one or more embodiments. A portable deer hunting stand, hunting enclosure, and wildlife observatory structure 100 may include a door 900 which is pivotally connected to a vertical support column/post 204, 214, 404 or 414 on a set of hinges 902. The door 900 may allow the portable hunting enclosure 100 to alternate between an open position and a closed position. The door 900 may include a lock 904 to secure the door 900 in the closed position.

The portable deer hunting stand, hunting enclosure and wildlife observatory structure 100 may comprise complementary components including multiple walls of predetermined dimensions, a flooring section 810 of predetermined size, and a roof section 804 of predetermined dimensions.

According to one or more aspects, the door may include an opening or window and a covering similar to each of the walls described above.

According to one or more aspects, the base section is designed to enhance stability at a ground level and enables the main body of the portable deer hunting stand, hunting enclosure and wildlife observatory structure to be lifted off the ground.

According to one or more aspects, the portable deer hunting stand, hunting enclosure and wildlife observatory structure can be disassembled via the interlocking mechanism.

According to an aspect of the invention, the portable deer hunting stand, hunting enclosure, and wildlife observatory structure can be assembled without hardware because of the interlocking features of the walls.

According to an implementation, the portable deer hunting stand, hunting enclosure and wildlife observatory structure measures approximately 5 feet in length×5 feet in width×7 feet in height. However, the portable deer hunting stand, hunting enclosure and wildlife observatory structure can be designed using any of multiple different size configurations. In addition, the portable deer hunting stand, hunting enclosure and wildlife observatory structure can be designed and built to accommodate/house as many users/hunters as desired.

According to an aspect, a user of the portable deer hunting stand, hunting enclosure and wildlife observatory structure can easily assemble and disassemble the portable deer hunting stand, hunting enclosure, and wildlife observatory structure along and in a matter of minutes. The portable deer hunting stand, hunting enclosure, and wildlife observatory structure is portable/moveable and does not need a trailer to be transported. As a result of a quick and efficient assembly process, the portable deer hunting stand, hunting enclosure, and wildlife observatory structure would not have to remain exposed to the debilitating effects of the weather as would a permanent structure, and, as a result, can be utilized for a longer period of time. Furthermore minimized exposure to the external environment and/or environmental conditions will prevent the portable deer hunting stand, hunting enclosure, and wildlife observatory structure from rotting or becoming infested with wasp nests or spiders, or reduce/minimize rotting and bug/insect infestation.

According to an aspect, the portable deer hunting stand, hunting enclosure, and wildlife observatory structure is designed to be elevated off the ground via the base section. Being elevated off the ground facilitates enhanced stability, particularly when the portable deer hunting stand, hunting enclosure, and wildlife observatory structure 900 is being placed on uneven ground/terrain.

According to an aspect, the portable deer hunting stand, hunting enclosure, and wildlife observatory structure provides an enclosed space meant to be provide disguise for hunters when hunting animals. The portable deer hunting stand, hunting enclosure, and wildlife observatory structure 900 is designed to be placed near the ground, rather than in a tree as tree placement limits accessibility. The portable deer hunting stand, hunting enclosure, and wildlife observatory structure 900 provides an enclosed building within which a user/hunter can remain while awaiting hunting targets. As a result, a targeted animal will not be able to see or smell the user/hunter.

According to an aspect, the stand has multiple walls (e.g., four walls), at least one door, a floor, a precut window, and a roof. Each individual component is made of lightweight material and is portable. According to an aspect, the portable deer hunting stand, hunting enclosure, and wildlife observatory structure may be made of a wood, pressure treated lumber, aluminum, a high density plastic or other similarly durable materials. As a result, the portable deer hunting stand, hunting enclosure, and wildlife observatory structure functions as an effective heat insulator in cold weather conditions.

Figure 10:
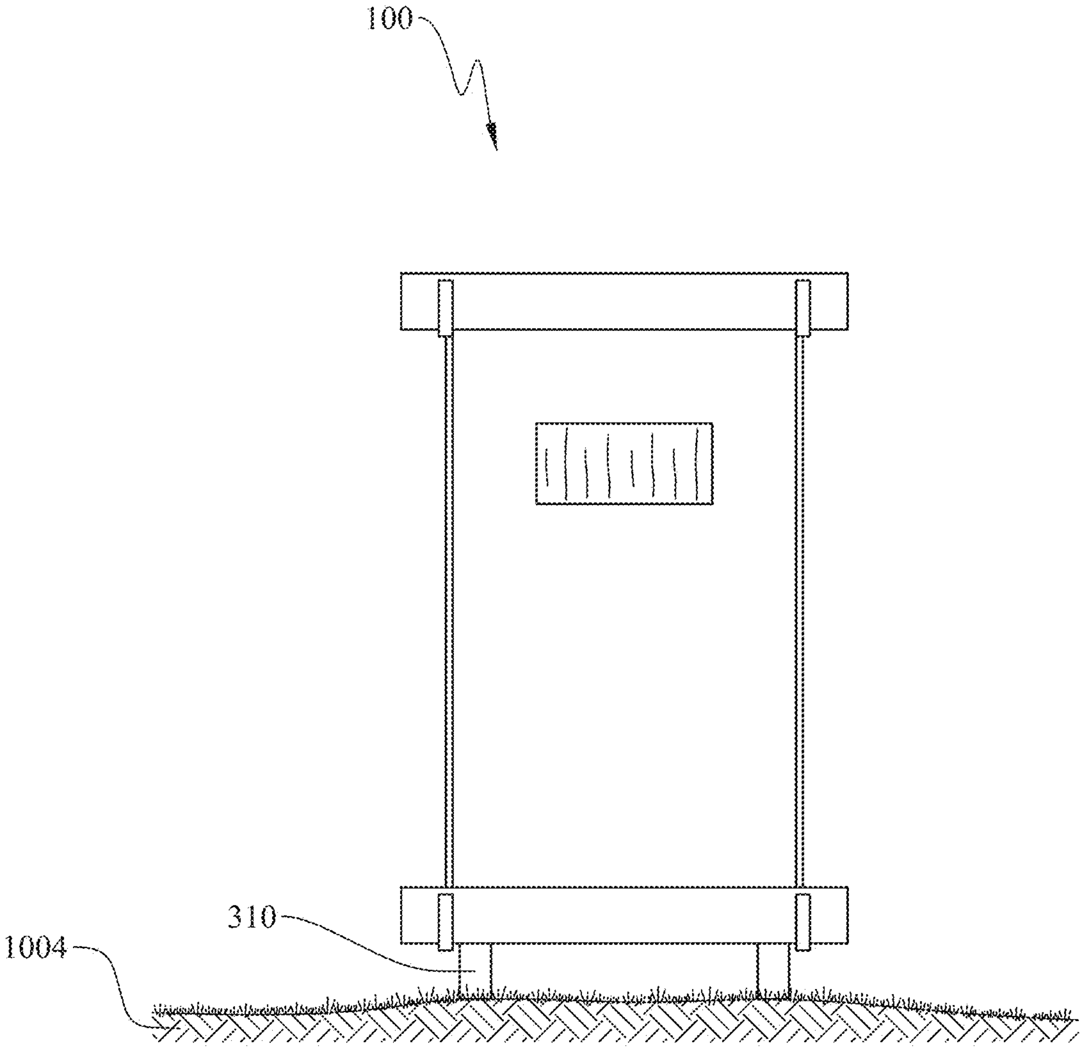
FIG. 10 illustrates a side view of the portable deer hunting stand and wildlife observatory structure, according to one or more embodiments.

FIG. 10 illustrates a side view of the portable deer hunting stand, hunting enclosure, and wildlife observatory structure 100, according to one or more embodiments. As illustrated, portable deer hunting stand, hunting enclosure and wildlife observatory structure 100 is placed in the field on the ground 1004 using the base section which includes a base section component 310 or 312, 110, 112. The base section component 310 is designed to enhance stability at a ground level and enables the main body (which excludes the base section components/feet) of the portable deer hunting stand, hunting enclosure, and wildlife observatory structure 900 to be lifted off the ground 310.

The exterior surfaces of the portable deer hunting stand, hunting enclosure, and wildlife observatory structure may be painted or covered in a camouflage to allow the device to disguise into the surrounding area of where the device is being used.

During use the portable deer hunting stand, hunting enclosure, and wildlife observatory may be assembled by a single person or a multiple people. First, a first wall may be positioned upright or erect, wherein the first notch beam is above the second notched beam. A complementary second wall may be positioned adjacent to the first wall in the same direction. The complementary notched beams of each wall are interlocked by bracing the first wall and then simultaneously lifting the second wall to insert the downward facing notches of the second wall into the upward facing notches of the first wall. Once connected, the two walls may stand upright without assistance or support. Next, another first wall may be positioned in similar fashion as the previous walls next to the second wall, at an opposite end from where the previous walls are connected. The walls may be fitted together by lifting the second wall to interlock the complementary notched beams as previously described. Finally, another second wall may be positioned next to the two first walls. The final wall may be lifted to interlock the notches and create the peripheral structure of the portable deer hunting stand.

Next, the door, which may be positioned on any of the walls, may be opened to receive the flooring section, where the flooring section may be positioned within the walls at the lower notched beams. Finally, the roof section may be lifted above the walls and positioned horizontally to rest against horizontal support beams of the walls.

Disassembly of the portable deer hunting stand, hunting enclosure, and wildlife observatory may be done by reversing the previous mentioned steps, wherein first the roof section or the flooring section may be removed, then the opposing flooring section or roof section is removed. Next, a second wall may be lifted to disengage its downward facing notches from the upward facing notches of the first walls. The order of wall disassembly may be according to the choosing of the user. All of the pieces may be easily portable and storable, stacked or resting against each other when not in use.

As described herein, a structure built using interlocked complementary components is disclosed. A portable deer hunting stand is assembled from components including multiple walls, a flooring section, a roof section, and a door. Walls that are designed to be placed in adjacent positions in the assembled structure are coupled to each other via an interlocking mechanism using complementary slotted/notched components. The door and each of the walls include a window, each window having a covering. The deer hunting stand, hunting enclosure, and wildlife observatory structure, which is configured to be a stand-alone structure, is built to be lifted off the ground via a base designed to enhance stability. The deer hunting stand, hunting enclosure, and wildlife observatory structure is built from lightweight materials to be portable and can be quickly disassembled via the interlocking mechanism.

A deer hunting stand comprises complementary components including a multiple walls of predetermined dimensions, a flooring section of predetermined size, a base section of preset dimensions, and a roof section of predetermined dimensions.

According to one or more aspects, each of the walls includes a rectangular section, two opposed vertical support columns/posts positioned at side peripheries of the wall, wherein the wall is designed with complementary slotted/notched beam components that enable adjacent walls to connect with each other via an interlocking mechanism to provide a stable interlocked enclosure.

According to one or more aspects, the roof section is placed into a first opening formed at an upper end of the stable enclosure, wherein the roof section is sized and shaped to be securely fitted into the first opening.

According to one or more aspects, a flooring section is placed into a second opening formed at a lower end of the interlocked enclosure, wherein the flooring section is sized and shaped to be securely fitted into the second opening.

According to one or more aspects, a door is integrated within a first wall of the multiple walls, wherein the rectangular section of the first wall is pivotally connected to a support column to function as the door.

According to one or more aspects, the door and each of the walls include a window, each window having a covering.

According to one or more aspects, the base section is designed to enhance stability at a ground level and enables the main body of the portable deer hunting stand to be lifted off the ground.

According to one or more aspects, the deer hunting stand can be disassembled via the interlocking mechanism.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A portable hunting enclosure comprising:

a plurality of complementary components of predetermined dimensions, where the plurality of complementary components create the portable hunting enclosure with a first opening and a second opening, and where the complementary components include:

a plurality of walls to create a peripheral support of the portable hunting enclosure, wherein each of the walls includes:

a panel, where the panel includes an upper portion, a lower portion an interior side, an exterior side and a pair of lateral sides, a pair of opposing vertical support columns, and a set of complementary notched beams, where the set of complementary notched B beams enable adjacent walls to connect with each other via the complementary interlocking beams to provide an interlocked portable hunting enclosure;

a flooring section to fit within the second opening;

a roof section atop the portable hunting enclosure within the first opening; and a door which is pivotally connected to one of the support columns of the wall.

2. The portable hunting enclosure according to claim 1, wherein the set of complementary notched beams includes a first set of beams and a second set of beams, where each of the first set of notched beams and the second set of notched beams includes an upper notched beam and a lower notched beam.

3. The portable hunting enclosure according to claim 2, wherein each first set of beams includes a pair of upward facing notches, and where each second set of beams includes a pair of downward facing notches.

4. The portable hunting enclosure according to claim 3, wherein the upward facing notches and the downward facing notches are complementary to interlock on themselves and interlock the plurality of walls together.

5. The portable hunting enclosure of claim 1, wherein each of the pair of opposing vertical support columns includes a base sections, where the base sections extend beyond the panel be in contact with the ground beneath the portable hunting enclosure.

6. The portable hunting enclosure of claim 5, wherein the base sections provide stability to the portable hunting enclosure.

7. The portable hunting enclosure of claim 1, wherein the set of complementary notched beams connect together to create a plurality of shaped intersections.

8. The portable hunting enclosure of claim 7, wherein the plurality of shaped intersections include an upper set of shaped intersections and a lower set of shaped intersections.

9. The portable hunting enclosure of claim 7, wherein the roof section includes a plurality of cutouts to receive the upper set of shaped intersections.

10. The portable hunting enclosure of claim 1, wherein the flooring section includes a plurality of cutouts to receive the lower set of shaped intersections.

11. The portable hunting enclosure of claim 1, wherein each wall of the plurality of walls further includes a horizontal support beam, where the horizontal support beams support the roof section.

12. The portable hunting enclosure of claim 1, wherein at least one of the panels includes an opening.

13. The portable hunting enclosure of claim 12, wherein the opening is a window.

14. The portable hunting enclosure of claim 13, wherein the window includes a covering.

15. The portable hunting enclosure of claim 12, wherein the opening extends an entire width of the panel to divide the panel into an upper portion and a lower portion.

16. The portable hunting enclosure of claim 1, wherein the door pivots on a set of hinges.

17. A portable hunting enclosure comprising:

a plurality of complementary components, where the plurality of complementary components create the portable hunting enclosure with a first opening and a second opening, and where the complementary components include:

a plurality of walls to create a peripheral support of the portable hunting enclosure, wherein each of the walls includes:

a panel, where the panel includes an upper portion, a lower portion an interior side, an exterior side and a pair of lateral sides, a pair of opposing vertical support columns, and an interlocking mechanism to enable adjacent walls to connect to provide an interlocked enclosure, where the interlocking mechanism includes a set of complementary notched beams, where the complementary set of notched beams includes an upper set of beams and a lower set of beams; and a plurality of notches on the set of complementary notched beams, where the plurality of notches interlock with each other on the set of complementary notched beams; and a flooring section to fit within the second opening;

a roof section atop the portable hunting enclosure within the first opening;

a door which pivotally connected to one of the support columns of the wall, and where the door enables access into an interior of the portable hunting enclosure.

* * * * *